(12) United States Patent
Tu et al.

(10) Patent No.: US 12,526,394 B2
(45) Date of Patent: Jan. 13, 2026

(54) MULTI-VIEW DISPLAY DEVICE

(71) Applicant: Acer Incorporated, New Taipei (TW)

(72) Inventors: Tsung-Wei Tu, New Taipei (TW); Chao-Shih Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 221 days.

(21) Appl. No.: 18/356,201

(22) Filed: Jul. 20, 2023

(65) Prior Publication Data

US 2024/0171725 A1  May 23, 2024

(30) Foreign Application Priority Data

Nov. 22, 2022  (TW) .................................. 111144676

(51) Int. Cl.
| | |
|---|---|
| *H04N 13/32* | (2018.01) |
| *F21V 8/00* | (2006.01) |
| *H04N 13/398* | (2018.01) |

(52) U.S. Cl.
CPC ........... *H04N 13/32* (2018.05); *G02B 6/0036* (2013.01); *H04N 13/398* (2018.05)

(58) Field of Classification Search
CPC .... H04N 13/32; H04N 13/398; H04N 13/351; G02B 6/0036; G02B 6/0068; G02B 6/0076
See application file for complete search history.

(56) References Cited

U.S. PATENT DOCUMENTS

| | | | |
|---|---|---|---|
| 9,479,767 B2 | 10/2016 | Van Der Horst | |
| 2021/0405694 A1* | 12/2021 | Rose | ........................ G06F 1/166 |
| 2022/0035088 A1* | 2/2022 | Fattal | .................... G02B 6/0036 |
| 2022/0413203 A1* | 12/2022 | Fattal | ..................... H04N 13/32 |

FOREIGN PATENT DOCUMENTS

| | | | |
|---|---|---|---|
| CN | 104597608 | 5/2015 | |
| CN | 111492305 | 8/2020 | |
| TW | 1514006 | 12/2015 | |
| TW | 201602639 | 1/2016 | |
| TW | 201802511 | 1/2018 | |
| TW | 202040210 | 11/2020 | |
| TW | 202101089 | 1/2021 | |
| TW | 202111357 | 3/2021 | |
| WO | 2020167374 | 8/2020 | |
| WO | WO-2023107103 A1 * | 6/2023 | ............. G02B 30/33 |

* cited by examiner

*Primary Examiner* — Joseph W Becker
(74) *Attorney, Agent, or Firm* — JCIPRNET

(57) ABSTRACT

A multi-view display device including a backlight module and a first light valve is provided. The backlight module includes a first light guide plate, a first light source, a second light guide plate, and a second light source. The first light guide plate has a plurality of first diffraction gratings. The first light source is disposed beside a first incident surface of the first light guide plate and configured to emit a first illumination beam. The second light guide plate has a plurality of second diffraction gratings. The second light source is disposed beside a second light incident surface of the second light guide plate and configured to emit a second illumination beam. The first light valve is disposed on the backlight module.

14 Claims, 7 Drawing Sheets

MULTI-VIEW DISPLAY DEVICE

CROSS-REFERENCE TO RELATED APPLICATION

This application claims the priority benefit of Taiwan application serial no. 111144676, filed on Nov. 22, 2022. The entirety of the above-mentioned patent application is hereby incorporated by reference herein and made a part of this specification.

BACKGROUND OF THE INVENTION

Field of the Invention

The invention relates to a display, and in particular, to a multi-view display device.

Description of Related Art

As users' needs for work and entertainment continue to evolve, multi-screen application situations have been developed. The possible occasions for general multi-screen usage are games, training, or office occasions. However, the current multi-screen products all lack the function of stereoscopic display. For e-sports players or training occasions, a multi-screen stereoscopic display with a large field of view is needed.

Conventional stereoscopic displays that produce large viewing angles require many pixels to form different viewing regions. However, for the side screen in a multi-screen environment, the direction facing the human eye is biased to one side. At this time, a large portion of the viewing region of a conventional large viewing angle stereoscopic display is not used, resulting in waste of pixels, and using too many pixels to form these viewing regions readily leads to a decrease in image resolution.

SUMMARY OF THE INVENTION

The invention provides a multi-view display device suitable for a single-screen or multi-screen situation, and having better resolution.

An embodiment of the invention provides a multi-view display device including a backlight module and a first light valve. The backlight module includes a first light guide plate, a first light source, a second light guide plate, and a second light source. The first light guide plate has a first surface, a second surface opposite to the first surface, and a first light incident surface connected to the first surface and the second surface, and has a plurality of first diffraction gratings. The first light source is disposed beside the first light incident surface and configured to emit a first illumination beam. The second light guide plate has a third surface, a fourth surface opposite to the third surface, and a second light incident surface connected to the third surface and the fourth surface, and has a plurality of second diffraction gratings. The second light source is disposed beside the second light incident surface and configured to emit a second illumination beam, wherein the first light guide plate and the second light guide plate are stacked together, and the first diffraction gratings diffract the first illumination beam into a plurality of first sub-beams in a plurality of first directions separated from each other. The second diffraction gratings diffract the second illumination beam into a plurality of second sub-beams in a plurality of second directions separated from each other, and an average direction of the second directions is inclined relative to an average direction of the first directions. The first light valve is disposed on the backlight module and has a plurality of pixels, wherein the pixels are respectively disposed on light paths of the first sub-beams and the second sub-beams.

In the multi-view display device of an embodiment of the invention, since the average direction of the second sub-beams diffracted by the second diffraction gratings of the second light guide plate is relative to the average direction of the first sub-beams diffracted by the first diffraction gratings of the first light guide plate, the second sub-beams may be applied to the side screen in a multi-screen situation, and may improve the resolution of the stereoscopic image by omitting some light-emitting directions. Moreover, the first sub-beams may display a stereoscopic image in a single-screen situation, or an intermediate screen in a multi-screen situation may display a stereoscopic image.

DESCRIPTION OF THE EMBODIMENTS

Figure 1:
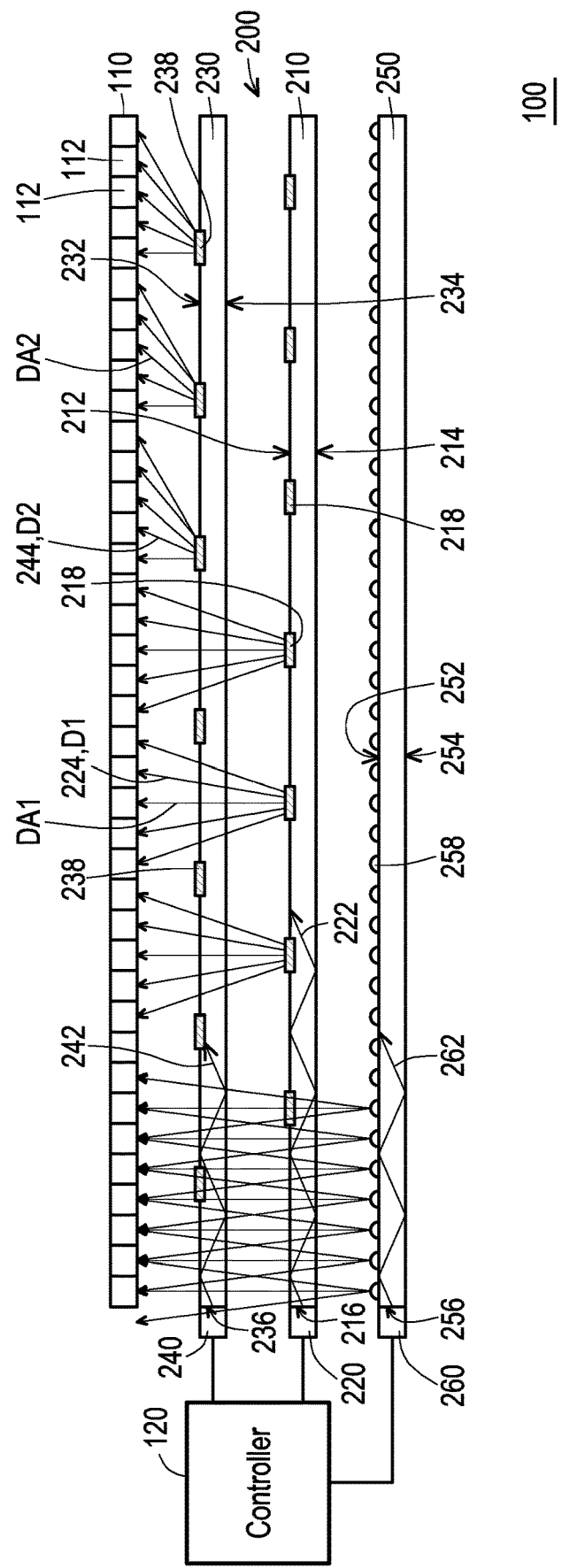
FIG. 1 is a schematic cross-sectional structure diagram of a multi-view display device of an embodiment of the invention.

FIG. 1 is a schematic cross-sectional structure diagram of a multi-view display device of an embodiment of the invention. Referring to FIG. 1, a multi-view display device 100 of the present embodiment includes a backlight module 200 and a first light valve 110. The backlight module 200 includes a first light guide plate 210, a first light source 220, a second light guide plate 230, and a second light source 240. The first light guide plate 210 has a first surface 212, a second surface 214 opposite to the first surface 212, and a first light incident surface 216 connected to the first surface 212 and the second surface 214, and has a plurality of first diffraction gratings 218. The first light source 220 is disposed beside the first light incident surface 216 and configured to emit a first illumination beam 222. The second light guide plate 230 has a third surface 232, a fourth surface 234 opposite to the third surface 232, and a second light incident surface 236 connected to the third surface 232 and the fourth surface 234, and has a plurality of second diffraction gratings 238. The second light source 240 is disposed beside the second light incident surface 236 and configured to emit a second illumination beam 242. In addition, the first light guide plate 210 and the second light guide plate 230 are stacked together.

The first diffraction gratings 218 diffract the first illumination beam 222 into a plurality of first sub-beams 224 in a plurality of first directions D1 separated from each other. The second diffraction gratings 238 diffract the second illumination beam 242 into a plurality of second sub-beams 244 in a plurality of second directions D2 separated from each other, and an average direction DA2 of the second directions D2 is inclined relative to an average direction DA1 of the first directions D1. The first light valve 110 is disposed on the backlight module 200 and has a plurality of pixels 112, wherein the pixels 112 are respectively disposed on the light paths of the first sub-beams 224 and the second sub-beams 244.

In the present embodiment, the backlight module 200 further includes a third light guide plate 250 and a third light source 260. The third light guide plate 250 has a fifth surface 252, a sixth surface 254 opposite to the fifth surface 252, and a third light incident surface 256 connected to the fifth surface 252 and the sixth surface 254, and has a plurality of optical microstructures 258. The third light source 260 is disposed beside the third light incident surface 256 and configured to emit a third illumination beam 262, wherein the optical microstructures 258 scatter the third illumination beam 262, and the first light valve 110 is disposed on the path of the scattered third illumination beam 262.

In the present embodiment, the first light guide plate 210 is disposed between the third light guide plate 250 and the first light valve 110, and the second light guide plate 230 is disposed between the third light guide plate 250 and the first light valve 110. In addition, in the present embodiment, the first light guide plate 210 is disposed between the third light guide plate 250 and the second light guide plate 230.

Specifically, the first illumination beam 222 emitted by the first light source 220 enters the first light guide plate 210 via the first light incident surface 216 and is continuously totally reflected by the first surface 212 and the second surface 214 and transmitted in the first light guide plate 210. When the first illumination beam 222 transmitted in the first light guide plate 210 encounters the first diffraction gratings 218, the first illumination beam 222 is diffracted by the first diffraction gratings 218 into the plurality of first sub-beams 224 separated from each other. The first sub-beams 224 pass through the second light guide plate 230 and are transmitted to different pixels 112 of the first light valve 110 respectively. In the present embodiment, the first light valve 110 is, for example, a liquid-crystal display panel, and the pixels 112 are pixels of the liquid-crystal display panel. However, in other embodiments, the first light valve 110 may also be other panels that may selectively pass light.

In the present embodiment, the first sub-beams 224 travel in different directions via different groups of pixels 112 to form a plurality of viewing regions in the space in front of the first light valve 110. When the user's eyes are respectively located in different viewing regions, and the different groups of pixels 112 also respectively display images of different viewing angles, the user experiences viewing a stereoscopic image. In other words, the multi-view display device 100 may be a stereoscopic display device.

Moreover, the second illumination beam 242 emitted by the second light source 240 enters the second light guide plate 230 via the second light incident surface 236 and is continuously totally reflected by the third surface 232 and the fourth surface 234 and transmitted in the second light guide plate 230. When the second illumination beam 242 transmitted in the second light guide plate 230 encounters the second diffraction gratings 238, the second illumination beam 222 is diffracted by the second diffraction gratings 238 into the plurality of second sub-beams 244 separated from each other. The second sub-beams 244 are transmitted to different pixels 112 of the first light valve 110 respectively.

In the present embodiment, these first diffraction gratings 218 are disposed on at least one of the first surface 212 and the second surface 214 (in FIG. 1, the first surface 212 is taken as an example), and the second diffraction gratings 238 are disposed on at least one of the third surface 232 and the fourth surface 234 (in FIG. 1, the third surface 232 is taken as an example). In the present embodiment, the first diffraction gratings 218 and the second diffraction gratings 238 are, for example, diffraction microstructures at the surface of the light guide plate. Moreover, in the present embodiment, the optical microstructures 258 are disposed at at least one of the fifth surface 252 and the sixth surface 254 (in FIG. 1, the fifth surface 252 is taken as an example).

In the present embodiment, the multi-view display device 100 further includes a controller 120 electrically connected to the first light source 220, the second light source 240, and the third light source 260, and configured to switch the first light source 220, the second light source 240, or the third light source 260 to emit light. For example, the controller 120 may make the first light source 220 emit light in one usage situation, and make the second light source 240 and the third light source 260 not emit light; and in another usage situation, the controller 120 may make the second light source 240 emit light, and make the first light source 220 and the third light source 260 not emit light; and in another usage situation, the controller 120 may make the third light source 260 emit light, and make the first light source 220 and the second light source 240 not emit light. In the present embodiment, the first light source 220, the second light source 240, and the third light source 260 are, for example, light-emitting diodes (LEDs), cold cathode fluorescent lamps, or other suitable light-emitting elements.

Figure 2A:
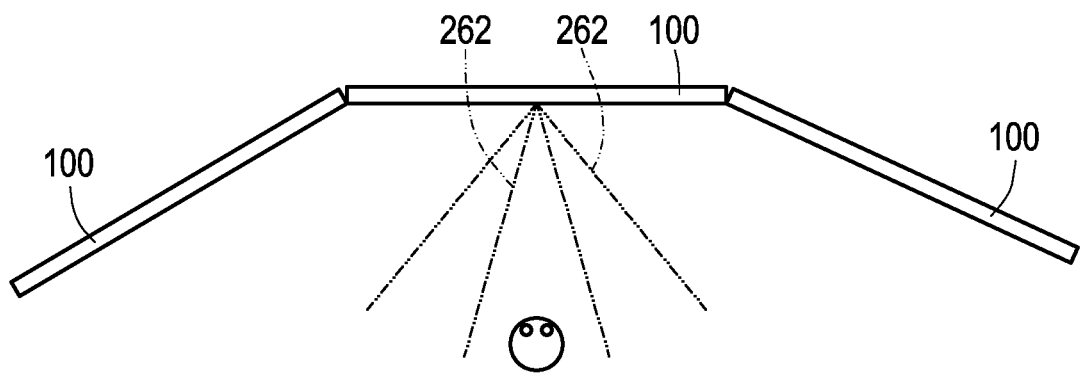
FIG. 2A to FIG. 2C show three application situations after a plurality of the multi-view display device of FIG. 1 form a multi-screen.
Figure 2B:
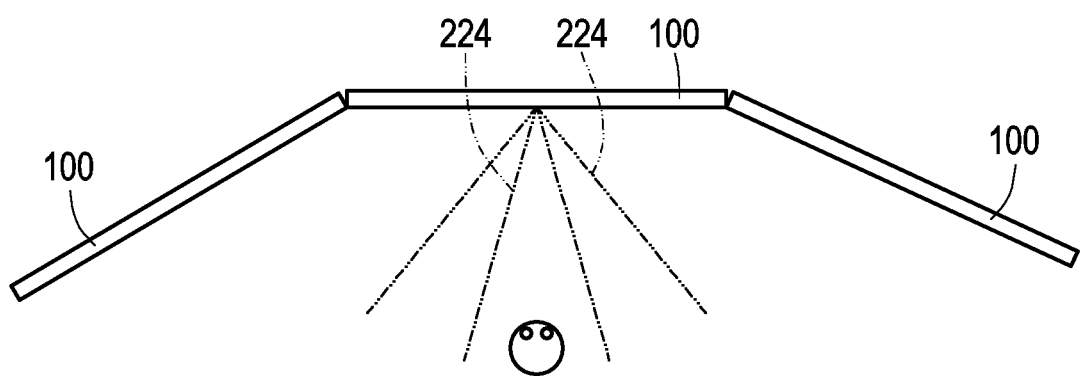
Figure 2C:
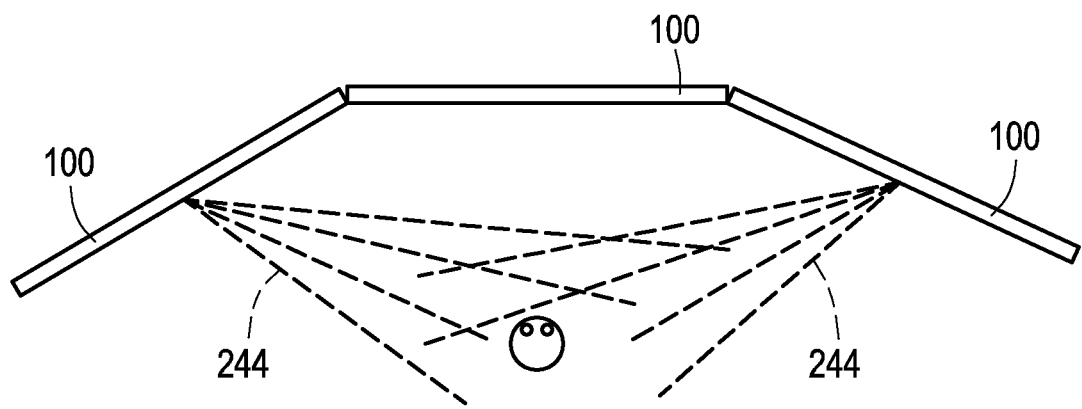

FIG. 2A to FIG. 2C show three application situations after a plurality of the multi-view display device of FIG. 1 form a multi-screen. Please refer to FIG. 1 and FIG. 2A, a plurality of multi-view display devices 100 may form a multi-screen, and FIG. 2A is an example of three multi-view display devices 100. In the case of the two-dimensional display mode, the controller 120 makes the third light source 260 emit light, and makes the first light source 220 and the second light source 240 not emit light. At this moment, the third illumination beam 262 scattered by the optical microstructures 258 irradiates the first light valve 110 more uniformly, and the pixels 112 of the first light valve 110 display a single plane image.

Please refer to FIG. 1 and FIG. 2B again. In the case of the stereoscopic display mode, for the multi-view display device 100 located in the middle, the controller 120 makes the first light source 220 emit light, and makes the second light source 240 and the third light source 260 not emit light. At this time, the plurality of first sub-beams 224 form a plurality of viewing regions in front of the middle multi-view display device 100, so that the user may see a stereoscopic image.

Please refer to FIG. 1 and FIG. 2C again. In the case of the stereoscopic display mode, for the multi-view display device 100 located at the side, the controller 120 makes the second light source 240 emit light, and makes the first light source 220 and the third light source 260 not emit light. At this time, the plurality of second sub-beams 244 form a plurality of viewing regions obliquely in front of the multi-view display device 100 located at the side, and these viewing regions cover the position of the user's eyes, so that the user may see the stereoscopic image. When a plurality of multi-view display devices 100 are actually used to form a multi-screen stereoscopic image, the situations in FIG. 2B and FIG. 2C coexist. That is, the multi-view display device 100 in the middle emits the plurality of first sub-beams 224, and at the same time, the multi-view display device 100 at the side also emits the second sub-beams 244.

It may be seen from FIG. 2C that, the second sub-beams 244 of the side multi-view display device 100 located at the left is obliquely emitted to the right, and the second sub-beams 244 of the side multi-view display device 100 located at the right is obliquely emitted to the left. Therefore, on the erection of a plurality of multi-view display devices 100, the vertical arrangement direction of the screen of the left-side multi-view display device 100 is 180 degrees different from the vertical arrangement direction of the screen of the right-side multi-view display device 100. In this way, the second sub-beams 244 of the side multi-view display device 100 located at the left may be obliquely emitted to the right. In order to facilitate the placement of the side multi-view display devices 100, in the present embodiment, a rotating mechanism 130 may be used to achieve a 180-degree rotation of the side multi-view display devices 100, which is described in detail below.

Figure 3:
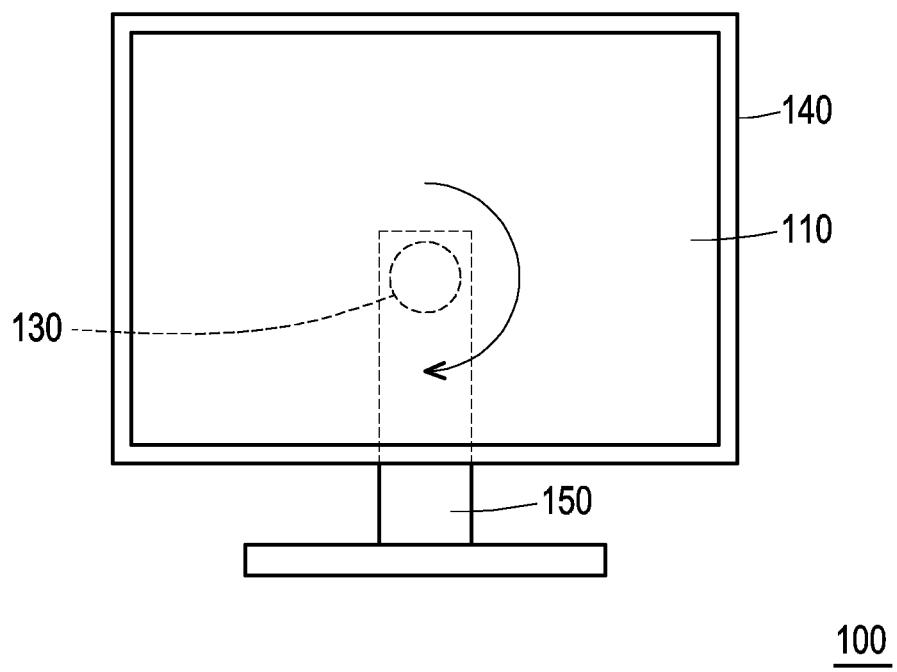
FIG. 3 is a schematic front view of the multi-view display device of FIG. 1.

FIG. 3 is a schematic front view of the multi-view display device of FIG. 1. Referring to FIG. 1 and FIG. 3, the multi-view display device 100 of the present embodiment further includes a back cover 140 carrying the backlight module 200 (as shown in FIG. 1) and the first light valve 110, wherein the backlight module 200 is disposed between the back cover 140 and the first light valve 110. In the present embodiment, the multi-view display device 100 further includes a stand 150 and the rotating mechanism 130. The rotating mechanism 130 is connected to the back cover 140 and the stand 150 and configured to rotate the back cover 140 relative to the stand 150 by at least 180 degrees. By rotating the back cover 140 to the correct direction via the rotating mechanism 130, the obliquely emitted second sub-beams 244 may be transmitted toward the user's eyes.

In the multi-view display device 100 of the present embodiment, since the average direction DA2 of the second sub-beams 244 diffracted by the second diffraction gratings 238 of the second light guide plate 230 is relative to the average direction DA1 of the first sub-beams 224 diffracted by the first diffraction gratings 218 of the first light guide plate 210, the second sub-beams 244 may be applied to the side screen of a multi-screen situation, and may improve the resolution of the stereoscopic image by omitting some light-emitting directions. This is because the second sub-beams 244 are deflected to one side and the number of viewing regions may be less, and the number of groups of the pixels 112 corresponding to these viewing regions may be less, thus increasing the number of the pixels 112 used by images in each viewing region, thereby improving the resolution of the stereoscopic image. Moreover, the first sub-beams 224 may display a stereoscopic image in a single-screen situation, or provide an intermediate screen in a multi-screen situation to display a stereoscopic image.

Figure 4A:
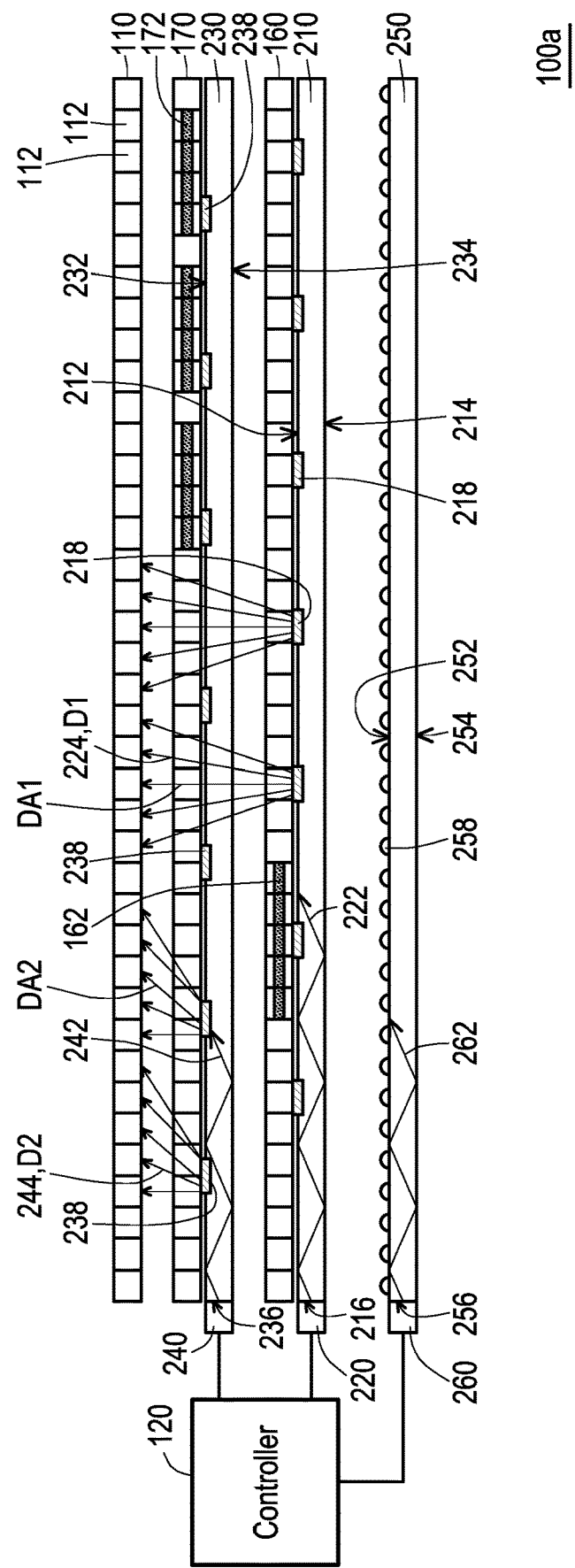
FIG. 4A is a schematic cross-sectional structure diagram of a multi-view display device of another embodiment of the invention.
Figure 4B:
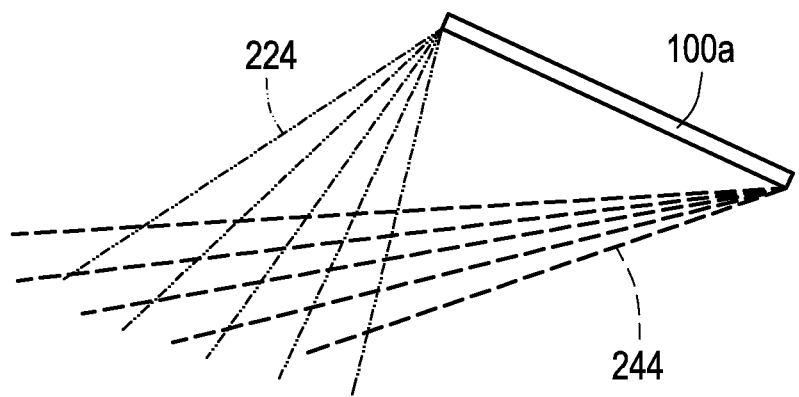
FIG. 4B is a schematic diagram of the multi-view display device of FIG. 4A applied to a side screen of a multi-screen.

FIG. 4A is a schematic cross-sectional view of a multi-view display device of another embodiment of the invention, and FIG. 4B is a schematic view of the multi-view display device of FIG. 4A applied to a side screen of a multi-screen. Please refer to FIG. 4A and FIG. 4B, a multi-view display device 100a of the present embodiment is similar to the multi-view display device 100 of FIG. 1, and the differences between the two are as follows. The multi-view display device 100a of the present embodiment further includes a second light valve 160 and a third light valve 170, the second light valve 160 is disposed between the first light valve 110 and the first light guide plate 210, and the third light valve 170 is disposed between the first light valve 110 and the second light guide plate 230. The controller 120 is also electrically connected to the second light valve 160 and the third light valve 170 and configured to control the second light valve 160 to shield the light of a partial region of the first light guide plate 210 and control the third light valve 170 to shield the light of another partial region of the second light guide plate 230. Specifically, that is, some of the pixels 162 of the second light valve 160 are switched to the light-shielding state, and other pixels are in the light-passing state. In addition, some of the pixels 172 of the third light valve 170 are switched to the light-shielding state, and other pixels are in the light-passing state. In other words, the controller 120 may cause the light emitted by the first light guide plate 210 and the second light guide plate 230 to produce a local dimming effect. In this way, the light may be adjusted in the near-center region (i.e., smaller viewing angle) and far-center region (i.e., larger viewing angle) of the side screen. The stereoscopic image of the near-center region may be covered by the multi-angle first sub-beams 224 emitted by the first light guide plate 210, and the stereoscopic image of the far-center region may be covered by the multi-angle second sub-beams 244 emitted by the second light guide plate 230 (as shown in FIG. 4B). That is, the controller 120 may make the first light source 220 and the second light source 240 emit light at the same time, and control the partial shielding effect of the second light valve 160 and the third light valve 170. In this way, the angle dependence of the field of view on the multi-angle stereoscopic display may be further improved, and the multi-angle range of the large field of view may be reduced, thereby improving the utilization of the pixels 112 and reducing some the graininess of the image.

Figure 5:
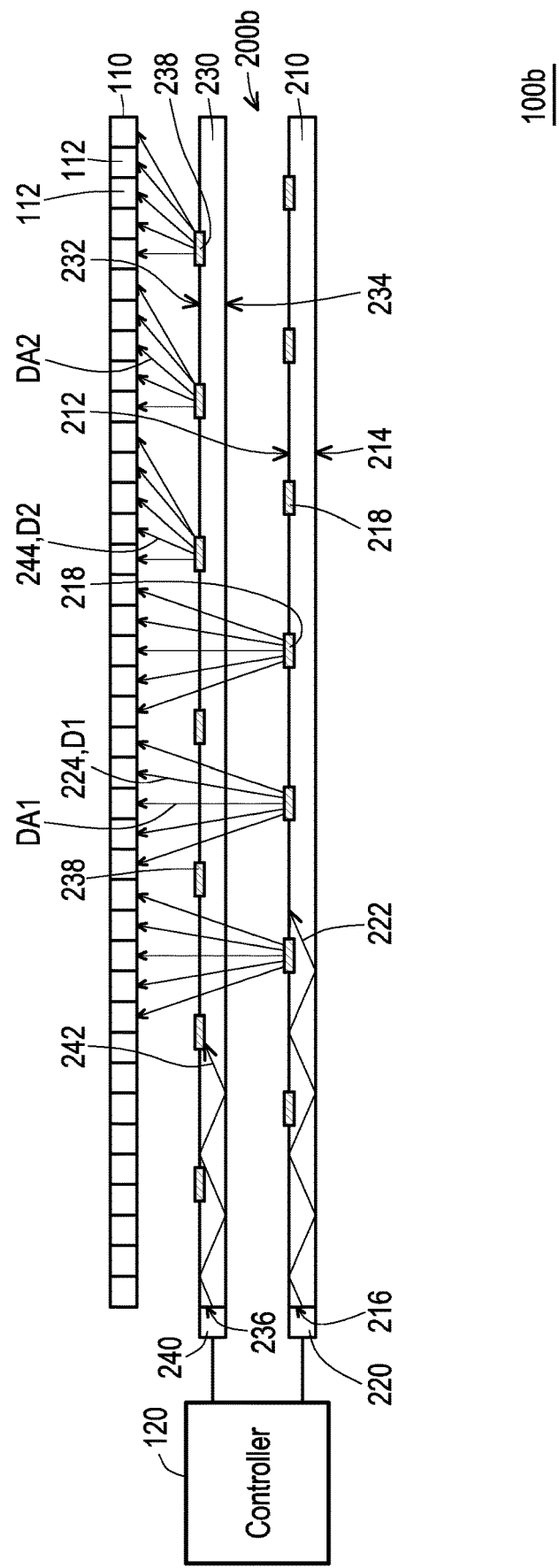
FIG. 5 is a schematic cross-sectional structure diagram of a multi-view display device of another embodiment of the invention.

FIG. 5 is a schematic cross-sectional structure diagram of a multi-view display device of another embodiment of the invention. Referring to FIG. 5, a multi-view display device 100b of the present embodiment is similar to the multi-view display device 100 of FIG. 1, and the difference between the two is that a backlight module 200b of the multi-view display device 100b of the present embodiment does not include the third light guide plate 250 and the third light source 260. That is, the multi-view display device 100b of the present embodiment has a stereoscopic display function, and does not need to have a two-dimensional display function.

Based on the above, in the multi-view display device of an embodiment of the invention, since the average direction of the second sub-beams diffracted by the second diffraction gratings of the second light guide plate is relative to the average direction of the first sub-beams diffracted by the first diffraction gratings of the first light guide plate, the second sub-beams may be applied to the side screen in a multi-screen situation, and may improve the resolution of the stereoscopic image by omitting some light-emitting directions. Moreover, the first sub-beams may display a stereoscopic image in a single-screen situation, or an intermediate screen in a multi-screen situation may display a stereoscopic image.

What is claimed is:
1. A multi-view display device, comprising:
a backlight module, comprising:
a first light guide plate having a first surface, a second surface opposite to the first surface, and a first light incident surface connected to the first surface and the second surface, and having a plurality of first diffraction gratings;
a first light source disposed beside the first light incident surface and configured to emit a first illumination beam;

a second light guide plate having a third surface, a fourth surface opposite to the third surface, and a second light incident surface connected to the third surface and the fourth surface, and having a plurality of second diffraction gratings; and a second light source disposed beside the second light incident surface and configured to emit a second illumination beam, wherein the first light guide plate and the second light guide plate are stacked together, the first diffraction gratings diffract the first illumination beam into a plurality of first sub-beams in a plurality of first directions separated from each other, the second diffraction gratings diffract the second illumination beam into a plurality of second sub-beams in a plurality of second directions separated from each other, and an average direction of the second directions is inclined relative to an average direction of the first directions;

a first light valve disposed on the backlight module and having a plurality of pixels, wherein the pixels are respectively disposed on light paths of the first sub-beams and the second sub-beams;

a second light valve disposed between the first light valve and the first light guide plate;

a third light valve disposed between the first light valve and the second light guide plate; and a controller electrically connected to the first light source, the second light source, the second light valve, and the third light valve, wherein the controller is configured to control the second light valve to shield a light of a partial region of the first light guide plate and control the third light valve to shield a light of another partial region of the second light guide plate.

2. The multi-view display device of claim 1, wherein the first diffraction gratings are disposed on at least one of the first surface and the second surface, and the second diffraction gratings are disposed on at least one of the third surface and the fourth surface.

3. The multi-view display device of claim 1, wherein the backlight module further comprises:

a third light guide plate having a fifth surface, a sixth surface opposite to the fifth surface, and a third light incident surface connected to the fifth surface and the sixth surface, and having a plurality of optical microstructures; and a third light source disposed beside the third light incident surface and configured to emit a third illumination beam, wherein the optical microstructures scatter the third illumination beam, and the first light valve is disposed on a path of the scattered third illumination beam.

4. The multi-view display device of claim 3, wherein the optical microstructures are disposed at at least one of the fifth surface and the sixth surface.

5. The multi-view display device of claim 3, wherein the controller is electrically connected to the first light source, the second light source, and the third light source and configured to switch the first light source, the second light source, or the third light source to emit a light.

6. The multi-view display device of claim 3, wherein the first light guide plate is disposed between the third light guide plate and the first light valve, and the second light guide plate is disposed between the third light guide plate and the first light valve.

7. The multi-view display device of claim 6, wherein the first light guide plate is disposed between the third light guide plate and the second light guide plate.

8. The multi-view display device of claim 3, wherein the third light source is a light-emitting diode or a cold cathode fluorescent lamp.

9. The multi-view display device of claim 1, wherein the first light valve is a liquid-crystal display panel.

10. The multi-view display device of claim 1, further comprising a back cover carrying the backlight module and the first light valve.

11. The multi-view display device of claim 10, further comprising:

a stand; and a rotating mechanism connected to the back cover and the stand and configured to make the back cover be rotated at least 180 degrees relative to the stand.

12. The multi-view display device of claim 1, wherein the first sub-beams travel in different directions via different groups of pixels to form a plurality of viewing regions in the space in front of the first light valve.

13. The multi-view display device of claim 1, wherein the second sub-beams are transmitted to different pixels of the first light valve respectively.

14. The multi-view display device of claim 1, wherein the first light source and the second light source are light-emitting diodes or cold cathode fluorescent lamps.

* * * * *